US008375188B1

(12) United States Patent
Shah et al.

(10) Patent No.: US 8,375,188 B1
(45) Date of Patent: Feb. 12, 2013

(54) TECHNIQUES FOR EPOCH PIPELINING

(75) Inventors: Dharmesh R. Shah, San Jose, CA (US);
Anurag Agarwal, Aundh (IN); Sameer Lokray, Cupertino, CA (US); Srikanth S Mahabalarao, Pune (IN); Thomas A. Bean, West Columbia, SC (US)

(73) Assignee: Symantec Corporation, Mountain View, CA (US)

( * ) Notice: Subject to any disclaimer, the term of this patent is extended or adjusted under 35 U.S.C. 154(b) by 1239 days.

(21) Appl. No.: 11/835,757

(22) Filed: Aug. 8, 2007

(51) Int. Cl.
*G06F 12/16* (2006.01)
*G06F 11/30* (2006.01)

(52) U.S. Cl. ............................ 711/169; 711/162; 714/13

(58) Field of Classification Search ................... 711/169
See application file for complete search history.

(56) References Cited

U.S. PATENT DOCUMENTS 5,388,242 A * 2/1995 Jewett ............................ 711/113
5,740,415 A * 4/1998 Hara .............................. 712/238

* cited by examiner

*Primary Examiner* — John Lane
(74) *Attorney, Agent, or Firm* — Wilmer Cutler Pickering Hale and Dorr LLP

(57) ABSTRACT

Techniques for epoch pipelining are disclosed. In one particular exemplary embodiment, the techniques may be realized as a method for epoch pipelining comprising the steps of beginning a first epoch, determining for one or more pages of memory if the pages of memory are likely to be modified in a subsequent epoch, performing a first operation on the pages of memory that are likely to be modified in a subsequent epoch, beginning a second epoch, subsequent to the first epoch, performing a second operation on the pages of memory that are not likely to be modified in a subsequent epoch, and ending the first epoch, wherein the first operation and the second operation are dissimilar.

19 Claims, 6 Drawing Sheets

TECHNIQUES FOR EPOCH PIPELINING

FIELD OF THE DISCLOSURE

The present disclosure relates generally to computerized system virtualization and, more particularly, to techniques for epoch pipelining.

BACKGROUND OF THE DISCLOSURE

Guest virtual machines may be operable to run on a physical machine in a virtualized environment. In such a virtualized environment, it may be desirable to have a near real-time backup of a memory and/or processor state of a guest virtual machine, for example to operate as a fail-over spare or to create multiple checkpoints of the guest virtual machine for debugging purposes. The operation of the guest virtual machine may be divided into one or more epochs. An epoch may be a unit of time in which one or more operations are completed in order to allow a guest virtual machine to perform operations, and to allow a checkpoint of the memory state of the guest virtual machine to be created and transmitted to a standby node. One epoch may begin and end, and a checkpoint may be created at the standby node, before a subsequent epoch may begin. The process of executing a new epoch only after the end of a previous epoch is known as a sequential execution of epochs.

One problem associated with the above-described guest virtual machine operation is that each epoch contains a significant amount of time where the guest virtual machine is in a paused state. While the guest virtual machine is in a paused state, the guest virtual machine cannot execute further operations. Executing the epochs sequentially means that the guest virtual machine has a set amount of time in each epoch to execute operations, and a set amount of time in each epoch to checkpoint the epoch and update the standby node. Sequential pipelining therefore presents a significant disadvantage in terms of processing power and processor administrative overhead.

In view of the foregoing, it may be understood that there are significant problems and shortcomings associated with current epoch pipelining technologies.

SUMMARY OF THE DISCLOSURE

Techniques for epoch pipelining are disclosed. In one particular exemplary embodiment, the techniques may be realized as a method for epoch pipelining comprising the steps of beginning a first epoch, determining for one or more pages of memory if the pages of memory are likely to be modified in a subsequent epoch, performing a first operation on the pages of memory that are likely to be modified in a subsequent epoch, beginning a second epoch, subsequent to the first epoch, performing a second operation on the pages of memory that are not likely to be modified in a subsequent epoch, and ending the first epoch, wherein the first operation and the second operation are dissimilar.

In accordance with other aspects of this particular exemplary embodiment, the first operation is immediate copying.

In accordance with further aspects of this particular exemplary embodiment, the second operation is re-transmit on write.

In accordance with additional aspects of this particular exemplary embodiment, the determination is made using a probability analysis.

In accordance with other aspects of this particular exemplary embodiment, the probability analysis includes the pages of memory modified in previous epochs.

In accordance with further aspects of this particular exemplary embodiment, the probability analysis is updated during operation.

In accordance with additional aspects of this particular exemplary embodiment, at least one signal embodied in at least one carrier wave for transmitting a computer program of instructions configured to be readable by at least one processor for instructing the at least one processor to execute a computer process for performing the method is provided.

In accordance with additional aspects of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as an apparatus for epoch pipelining comprising an I/O module configured to transmit one or more memory pages, a standby node interface module configured to communicate with one or more standby nodes, and an epoch module configured to create and maintain a plurality of epochs, wherein one or more of the plurality of epochs overlap in time.

In accordance with other aspects of this particular exemplary embodiment, the I/O module, the standby node interface module, and the epoch module are in communication with each other.

In accordance with further aspects of this particular exemplary embodiment, the I/O module is in communication with one or more memory pages.

In another particular exemplary embodiment, the techniques may be realized as a system for epoch pipelining comprising means for beginning a first epoch, means for determining for one or more pages of memory if the pages of memory are likely to be modified in a subsequent epoch, means for performing a first operation on the pages of memory that are likely to be modified in a subsequent epoch, means for beginning a second epoch, subsequent to the first epoch, means for performing a second operation on the pages of memory that are not likely to be modified in a subsequent epoch, and means for ending the first epoch, wherein the first operation and the second operation are dissimilar.

In accordance with other aspects of this particular exemplary embodiment, the first operation is immediate copying.

In accordance with further aspects of this particular exemplary embodiment, the second operation is re-transmit on write.

In accordance with additional aspects of this particular exemplary embodiment, the determination is made using a probability analysis.

In accordance with other aspects of this particular exemplary embodiment, the probability analysis includes the pages of memory modified in previous epochs.

In accordance with further aspects of this particular exemplary embodiment, the probability analysis is updated during operation.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
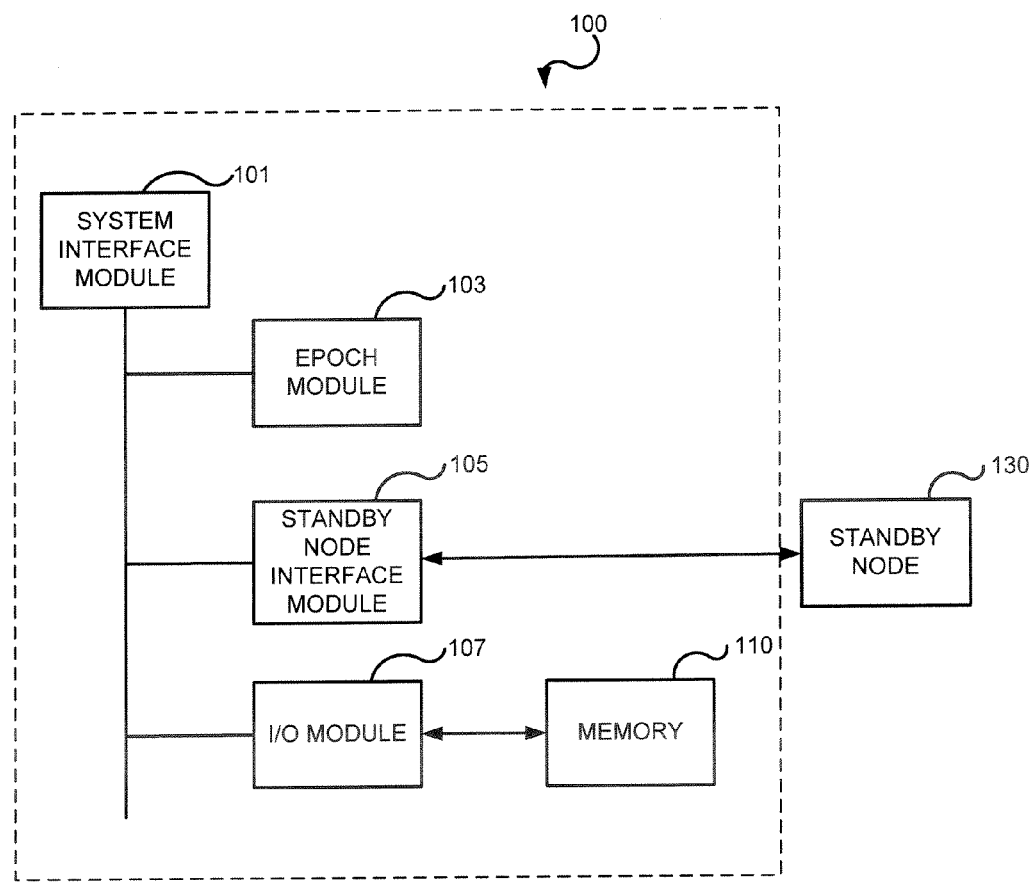
FIG. 1 shows a diagram view of a system in accordance with an embodiment of the present disclosure.

Referring to FIG. 1, a diagram level overview of a system 100 is shown in accordance with an embodiment of the present disclosure. The system 100 may comprise a system interface module 101, an epoch module 103, a standby node interface module 105, and an input/output ("I/O") module 107. Each module may interact with each other module. In one embodiment, the modules may be contained within one physical system, but this is not necessary. In another embodiment, one or more modules may be placed on one or more physical systems, for example on one or more computers. The one or more computers, and the one or more modules which may reside on the one or more computers, may be in communication via a network. Each module will be explained in more detail below. Additionally, the system 100 may be operable to execute one or more guest virtual machines may operate in the system. The guest virtual machines may be operable to perform operations.

The system interface module 101 may be operable to permit or allow some or all of the other modules to interact with one another. The interaction may allow one or more of the modules to transmit signals to another one or more of the modules, or the system interface module 101 may selectively permit signals to be transmitted between one or more modules. The signals may constitute packets of data, or other types of signals transmitted between one or more modules and one or more other modules.

The epoch module 103 may be operable to create and maintain one or more epochs within the system 100. The epoch module 103 may create a new epoch at predetermined time intervals, or may create epochs at variable times. For example, if one guest virtual machine requires a larger amount of processing time than another guest virtual machine on the system 100, then the epoch module 103 may allow the first guest virtual machine a comparatively longer epoch time, so that more time may be devoted to processing operations.

The standby node interface module 105 may be in communication with a standby node 130. The standby node interface module 105 may be operable to send one or more data blocks to the standby node 130. The standby node interface module 105 may also be operable to read one or more data blocks from the standby node 130.

The standby node 130 may be another system, separate from the system 100, or may be located within the same physical space. If the standby node 130 and the system 100 are located separately from one another, then the standby node 130 and the system 100 may be in communication with one another. The method of communication may take any form of communicating data between systems. For example, the system 100 and the standby node 130 may communicate via a wire or a wireless link, or may be connected via a network. The standby node 130 may contain one or more epoch stores, operable to store the data blocks communicated via the standby node interface module 105. The one or more epoch stores may be one or more electronic files, may be contained within one or more databases, or may be stored in any kind of random-access memory (RAM). The standby node 130 may be operable to recall one or more of the one or more data blocks communicated via the standby node interface module 105 and stored in one or more of the one or more epoch stores.

The I/O module 107 may be operable to read input from one or more input devices and write output to one or more output devices. The I/O module 107 may be in communication with memory or storage devices 110 associated with the system 100, and may be in communication with the standby node interface module 105, so that data blocks modified by the system 100 may be communicated to the memory or storage devices 110 associated with the system 100 and also with the standby node interface module 105.

Figure 1A:
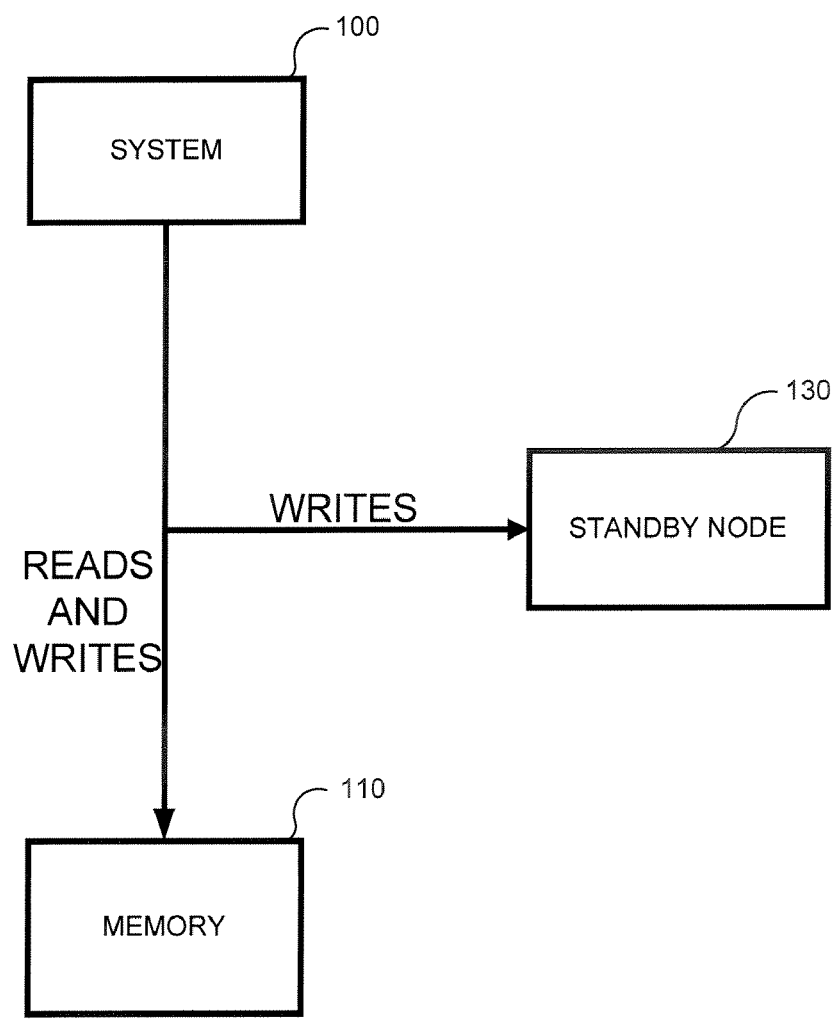
FIG. 1a shows the flow of data from a system to a standby node in one particular operation mode accordance with an embodiment of the present disclosure.

Turning now to FIG. 1a, a flow of data from the system 100 to the standby node 130 and the memory or storage devices 110 is shown in accordance with an embodiment of the present disclosure. The memory or storage devices 110 are shown separately from the system 100 for exemplary purposes. The system 100, and the memory or storage devices 110 associated with the system 100, may be in communication. The memory or storage devices 110 associated with the system 100 may include, but are not limited to, RAN, a magnetic hard drive, optical storage, or a tape drive. The system 100 may read information from the memory or storage devices 110, and may write information to the memory or storage devices 110. Reading and writing information may occur by requesting one or more blocks from the memory or storage devices 110, and writing one or more blocks to the memory or storage devices 110. When the system 100 sends an updated memory block to the memory or storage devices 110, the standby node interface module 105, either working with the I/O module 107 and/or the epoch module 103 or separate from the I/O module 107 and the epoch module 103, may transmit one or more memory blocks to the standby node system at the end of the epoch.

Figure 2:
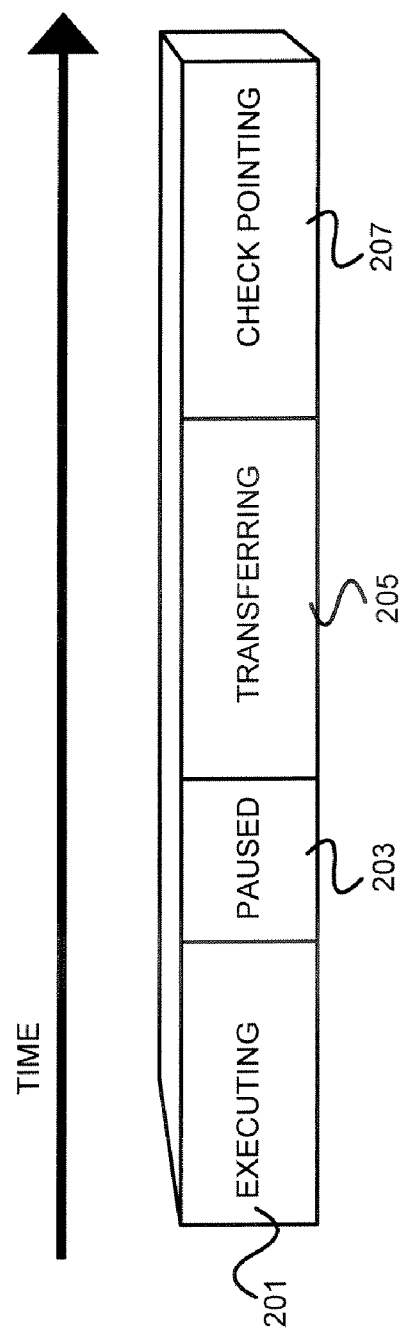
FIG. 2 shows the cycle of a typical epoch according to time in accordance with an embodiment of the present disclosure.

Turning now to FIG. 2, a cycle of a typical epoch according to time in accordance with an embodiment of the present disclosure is shown. The steps in the epoch cycle may be executed left to right in FIG. 2, as time moves forward from left to right. The steps are shown by example only. The relative size of the steps may not be indicative of the relative amount of time each step takes to execute. Also, more or fewer steps may be implemented in an epoch. The steps in FIG. 2 are shown merely to illustrate an embodiment of the present disclosure.

In a first step 201, a guest virtual machine may be allowed to execute code or commands. The time allowed to execute the code or commands may be controlled by the system 100, or may be controlled by the guest virtual machine operating within the system 100. The first step 201 may include receiving input or creating output, and may also include reading or writing to the memory 110.

In a second step 203, the guest virtual machine of the system 100 is paused. The guest virtual machine may be paused so that no further inputs or outputs may be considered. The guest virtual machine may also be paused to prevent any further change to memory 110 while it is transferred to standby node 130. The guest virtual machine may be paused to allow for a consistent state to be achieved. In the paused state, some or all of the output of the guest virtual machine may be blocked from being written to the memory 110.

In a third step 205, the system 100 may be operable to transfer the execution state of the system 100 after pausing in the second step 203. The system 100 may be operable to transfer all or a part of the contents of the memory 110 to the standby node 130 via the standby node interface module 105, or may be operable to transfer other data to the standby node 130.

In a fourth step 207, the process of replicating or transferring changes on the standby node 130 may be executed. This state may also be known as a "checkpoint" or "checkpointing" the epoch. Changes in the guest virtual machine memory 110 may be replicated on the standby node 130, so that the standby node 130 may have substantially similar data as a target guest virtual machine.

After completion of the fourth step 207, the guest virtual machine may resume normal operation and continue executing operations in the first step of a subsequent epoch.

Figure 3:
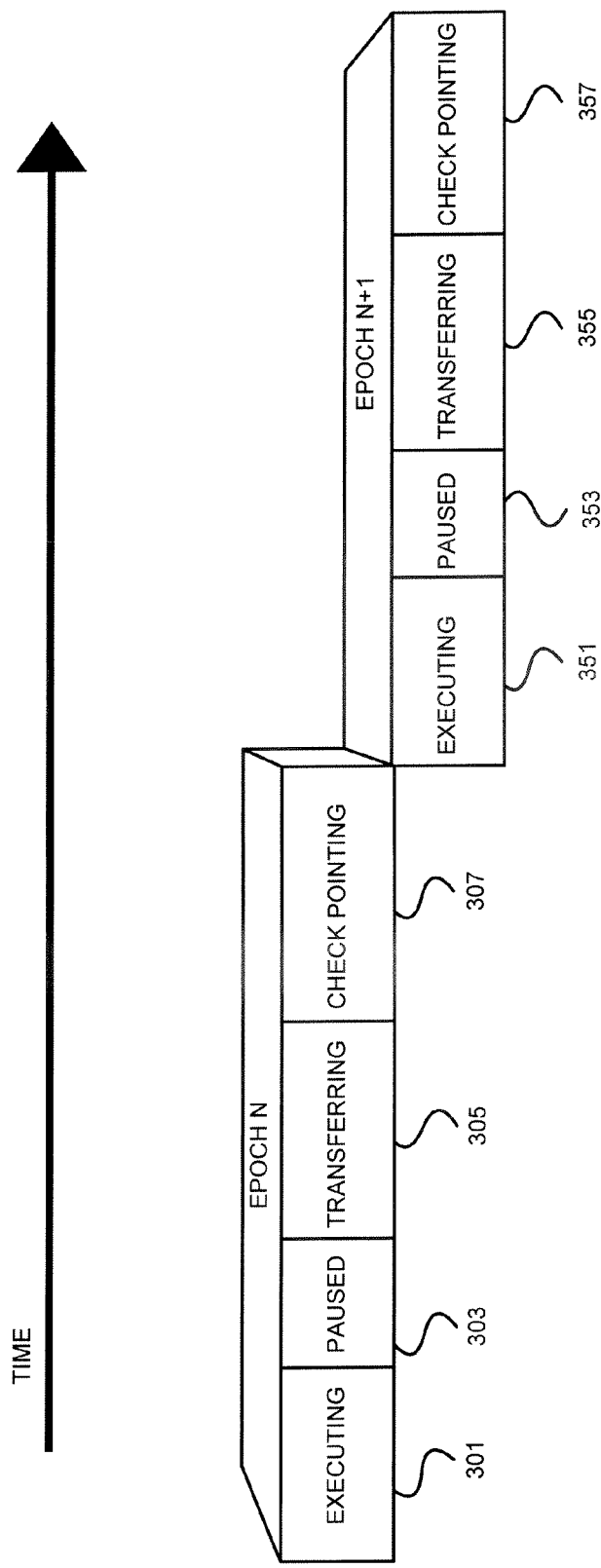
FIG. 3 shows a diagram of non-overlapping epochs that are not pipelined in accordance with an embodiment of the present disclosure.

Turning now to FIG. 3, a diagram of non-overlapping epochs that are not pipelined is shown in accordance with an embodiment of the present disclosure. In this method, epoch N may begin, and the four steps 301-307 for epoch N may be executed sequentially as shown in FIG. 2 above. After the four steps 301-307 are executed, epoch N may conclude, and epoch N+1 may begin. After the four steps 351-357 of epoch N+1 are executed, epoch N+1 may conclude, and epoch N+2 (not shown) may begin. The steps of the epochs may not overlap in the embodiment shown in FIG. 3. This method of epoch execution may require that the guest virtual machine be placed in a paused state for a substantial amount of time per epoch.

Figure 4:
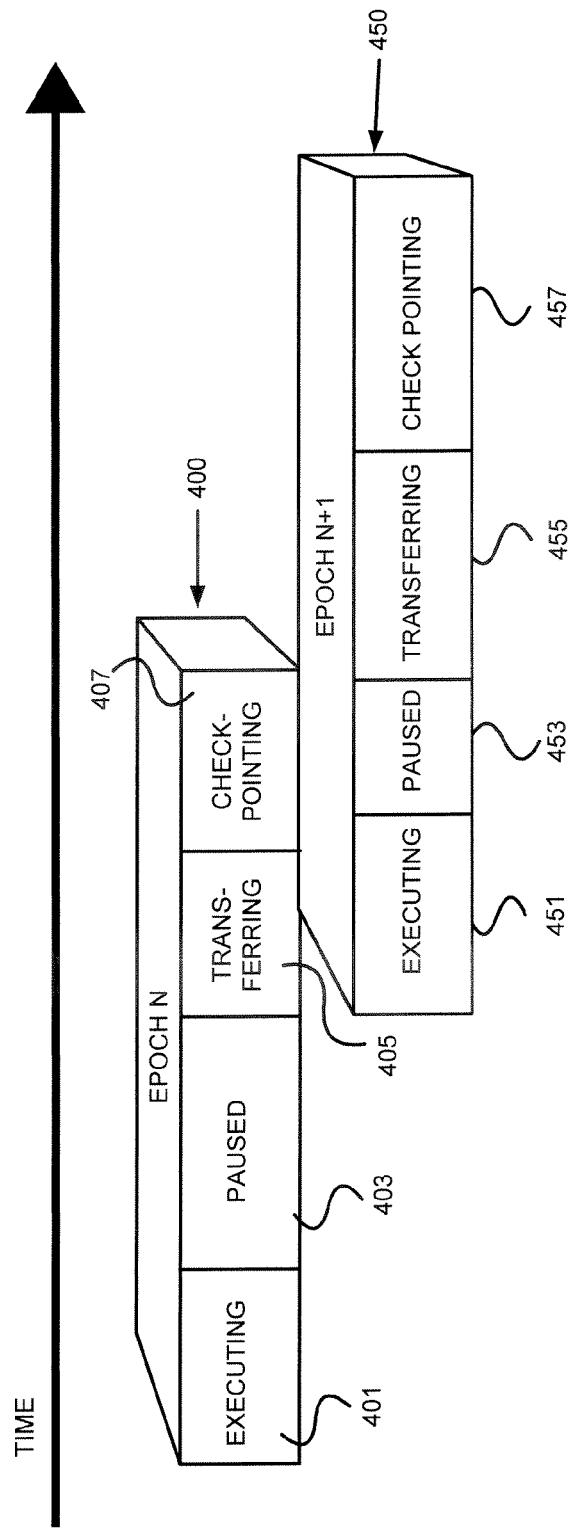
FIG. 4 shows a diagram of overlapping epochs that may be pipelined in accordance with another embodiment of the present disclosure.

Turning now to FIG. 4, a diagram of overlapping epochs that may be pipelined is shown in accordance with another embodiment of the present disclosure. In this method of epoch execution, one epoch may begin before one or more of the steps of a previous epoch or epochs have concluded. For example, the first step 401 of epoch N 400 may execute, with the guest virtual machine executing one or more operations. The second step 403 of epoch N may then begin, and the guest virtual machine may be paused. While the guest virtual machine is paused, both the transferring step 405 and/or the checkpointing step 407 of epoch N 400, as well as the executing step 451 and/or the pausing step 453 of the subsequent epoch N+1 450, may execute simultaneously, with the system 100 resuming the virtual machine after the pausing step 403. In this way, the guest virtual machine may be paused for less overall time than if the virtual machine were paused from the second step 403 of epoch N 400 until the beginning of step one 451 of subsequent epoch N+1 450.

Steps where the guest virtual machine may be executing operations may not be able to be overlapped, but steps where data is transferred to the standby node and the epoch N 400 is checkpointed may be able to be executed while the guest virtual machine is executing operations in a subsequent epoch N+1 450. It is conceivable that more than two epochs may overlap, and that, for example, the transferring and checkpointing steps of an epoch N 400 may be executing while the transferring 455 and checkpointing steps 457 of epoch N+1 450 are executing, and while the guest virtual machine is executing operations in epoch N+2 (not shown). In this manner, a pipelined set of epochs may be created, so that execution time of a guest virtual machine may be maximized.

In an epoch pipelining mode, the operations step of epoch N+1 450 may attempt to modify one or more memory pages. The state of the memory pages of epoch N 400, which may be preserved and transmitted to the standby node when epoch N 400 is checkpointed, may not have been checkpointed at the time of the attempt. Therefore, the state of the memory pages after the execution step of epoch N 400 must be preserved until the memory pages of epoch N 400 are transmitted and checkpointed in the standby node. A page conflict is an attempt to modify a memory page in a subsequent epoch N+1 450 before the contents of the memory page have been checkpointed in the standby node 130.

To detect and protect against page conflicts, after the guest virtual machine is paused after the execution phase of an epoch, the pages which were modified in that epoch may be guarded. A guarded page may be set to be read-only, so that the page may be read, but an attempt to modify the page may generate a hardware or software exception.

Figure 5:
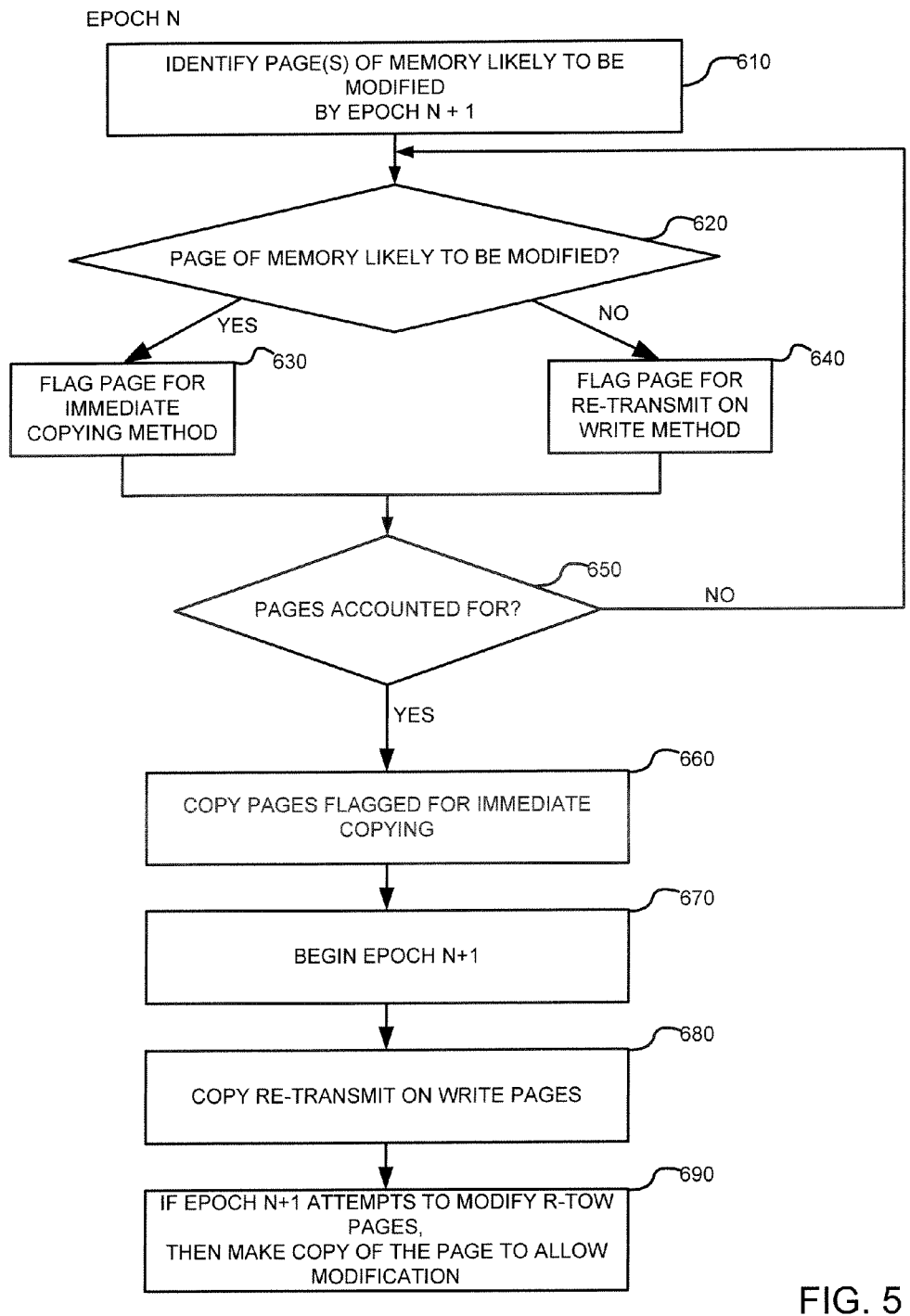
FIG. 5 shows a flow chart of a method for pipelining epoch data transmission in accordance with an embodiment of the present disclosure.

Turning now to FIG. 5, a flow chart of a method for pipelining epoch data transmission is shown in accordance with an embodiment of the present disclosure. As shown in block 610, after the execution phase of epoch N, the system 100 may attempt to identify memory pages which are likely to be modified in epoch N+1. The set of pages that were modified during epoch N and/or earlier epochs may be used to determine which pages are likely to be modified during epoch N+1. The set of pages that may be modified during epoch N+1 or later epochs may change across subsequent epochs. A probability analysis may be executed to determine which pages are likely to be modified in subsequent epochs. The probability analysis may be accomplished using one or more metrics. The probability analysis may also be tuned so that more or fewer pages are identified as likely to be modified from epoch N to subsequent epochs. Such tuning may occur during operation of the system 100. Over successive epochs, some memory pages may be added to the set of pages, and some memory pages may be removed from the set of pages that are likely to be modified.

As shown in block 620, the system may analyze pages of memory available to the guest virtual machine. If the page of memory is likely to be modified, based on the identification of pages likely to be modified as shown in block 610, then the system 100 may designate that the particular page of memory may be immediately copied to the standby node 130, shown in block 630. If the page of memory is not as likely to be modified, based on the identification of pages likely to be modified as shown in block 610, then the system may designate the particular page of memory for a re-transmit on write method, as shown in block 640.

A page which is designated for immediate copying may be copied to the standby node 130 while the guest virtual machine is in a paused state, and some or all of the pages designated for immediate copying may be copied to the standby node 130 before a subsequent epoch may begin. Or, the pages which are designated for immediate copying may be copied to a separate segment of the system memory 110, so that the original pages may be modified in subsequent epochs, but the copied memory pages may be transmitted to the standby node 130 after the beginning of a new epoch at a later time.

Memory pages which are designated according to a re-transmit on write method during epoch N may be protected, and may not be copied to the standby node 130 before a subsequent epoch N+1 may begin. If a subsequent epoch N+1 attempts to modify a memory page which is protected according to a re-transmit on write method during epoch N, the system 100 may generate an exception, and may make a copy of the page which the subsequent epoch N+1 is trying to modify. The guest virtual machine in a subsequent epoch N+1 may be able to modify the original memory page. The copy of the page may then be transmitted to the standby node 130 and associated with the epoch N.

As shown in block 650, the system 100 may attempt to account for each of the pages of memory to which the guest virtual machine has access. For each page of memory, the system 100 may attempt to designate the page with the group for immediate copying, or the group to protect according to the re-transmit on write method.

When the pages of memory have been designated, the system 100 may copy some or all of the pages of memory designated for immediate copying to either the standby node 130 or to separate pages of the system memory 110, as shown in block 660. In an alternate embodiment, the system 100 may transmit a page of memory to the standby node 130 or to a separate page of the system memory 110 as soon as the particular page is designated for immediate copying.

When the pages of memory designated for immediate copying have been copied to the standby node 130 or to separate pages of system memory 110, the epoch module 103 may allow the subsequent epoch N+1 to begin, as shown in block 670. In an optional step as shown in block 680, the system 100 may copy some or all of the pages designated for the re-transmit on write method to the standby node 130 or to separate pages of system memory 110 after the subsequent epoch N+1 begins.

As shown in block 690, if the subsequent epoch N+1 attempts to modify a page of memory which has been designated for the re-transmit on write method, then the system 100 may create a hardware or software exception, may make a copy of the page of memory that epoch N+1 attempts to modify, and may allow epoch N+1 to modify the original page of memory. The copy may be used by the system 100 to transmit to the standby node for association with epoch N.

At this point it should be noted that the operation of a system and method in accordance with the present disclosure as described above typically involves the processing of input data and the generation of output data to some extent. This input data processing and output data generation may be implemented in hardware or software. For example, specific electronic components may be employed in a processor or similar or related circuitry for implementing the functions associated with epoch pipelining in accordance with the present disclosure as described above. Alternatively, one or more processors operating in accordance with stored instructions may implement the functions associated with epoch pipelining in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for epoch pipelining comprising the steps of:
    beginning a first epoch for a virtual machine;
    determining for one or more pages of memory available to the virtual machine if the one or more pages of memory are likely to be modified in a subsequent epoch for the virtual machine, wherein the determination is based at least in part upon the one or more pages of memory that were modified during the first or earlier epochs;
    performing a first operation on the one or more pages of memory that are likely to be modified in a subsequent epoch for the virtual machine;
    beginning a second epoch for the virtual machine, subsequent to the first epoch;
    performing a second operation on the one or more pages of memory that are not likely to be modified in a subsequent epoch for the virtual machine; and
    ending the first epoch;
    wherein the first operation and the second operation are dissimilar.

2. The method according to claim 1, wherein the first operation comprises designating for immediate copying the one or more pages of memory that are likely to be modified in a subsequent epoch for the virtual machine.

3. The method according to claim 1, wherein the second operation is re-transmit on write.

4. The method according to claim 1, wherein the determination is made using a probability analysis.

5. The method according to claim 4, wherein the probability analysis includes pages of memory modified in previous epochs.

6. The method according to claim 4, wherein the probability analysis is updated during operation.

7. At least one non-transitory processor readable storage medium for storing a computer program of instructions configured to be readable by at least one processor for instructing the at least one processor to execute a computer process for performing the method as recited in claim 1.

8. The method according to claim 1, wherein the virtual machine is a guest virtual machine configured to run on a physical machine in a virtualized environment.

9. An apparatus for epoch pipelining comprising:
    an I/O module configured to transmit one or more memory pages;
    a standby node interface module configured to communicate with one or more standby nodes; and
    an epoch module configured to create and maintain a plurality of epochs for a virtual machine, and determine for one or more pages of memory available to the virtual machine if the one or more pages of memory are likely to be modified in a subsequent epoch for the virtual machine, wherein the determination is based at least in part upon the one or more pages of memory that were modified during a current or earlier epochs;

wherein one or more of the plurality of epochs overlap in time.

10. The apparatus according to claim 9, wherein the I/O module, the standby node interface module, and the epoch module are in communication with each other.

11. The apparatus according to claim 9, wherein the I/O module is in communication with the one or more memory pages.

12. The apparatus according to claim 9, wherein the virtual machine is a guest virtual machine configured to run on a physical machine in a virtualized environment.

13. A system for epoch pipelining comprising:

means for beginning a first epoch for a virtual machine;

means for determining for one or more pages of memory available to the virtual machine if the one or more pages of memory are likely to be modified in a subsequent epoch for the virtual machine, wherein the determination is based at least in part upon the one or more pages of memory that were modified during the first or earlier epochs;

means for performing a first operation on the one or more pages of memory that are likely to be modified in a subsequent epoch for the virtual machine;

means for beginning a second epoch for the virtual machine, subsequent to the first epoch;

means for performing a second operation on the one or more pages of memory that are not likely to be modified in a subsequent epoch for the virtual machine; and means for ending the first epoch;

wherein the first operation and the second operation are dissimilar.

14. The system according to claim 13, wherein the first operation comprises designating for immediate copying the one or more pages of memory that are likely to be modified in a subsequent epoch.

15. The system according to claim 13, wherein the second operation is re-transmit on write.

16. The system according to claim 13, wherein the determination is made using a probability analysis.

17. The system according to claim 16, wherein the probability analysis includes pages of memory modified in previous epochs.

18. The system according to claim 16, wherein the probability analysis is updated during operation.

19. The system according to claim 13, wherein the virtual machine is a guest virtual machine configured to run on a physical machine in a virtualized environment.

* * * * *